US008340906B2

(12) United States Patent
Jung et al.

(10) Patent No.: US 8,340,906 B2
(45) Date of Patent: Dec. 25, 2012

(54) METHOD FOR GENERATING AND SEARCHING THROUGH TRAJECTORY CONTENT PERFORMED IN NAVIGATION DEVICE

(75) Inventors: Min-chul Jung, Suwon-si (KR); Jeong-hoon Park, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 672 days.

(21) Appl. No.: 12/479,900

(22) Filed: Jun. 8, 2009

(65) Prior Publication Data

US 2010/0169011 A1 Jul. 1, 2010

(30) Foreign Application Priority Data

Dec. 26, 2008 (KR) ........................ 10-2008-0134956

(51) Int. Cl.
*G01C 21/00* (2006.01)
(52) U.S. Cl. ............... 701/472; 701/1; 701/4; 701/9; 701/14; 701/120; 701/301; 701/409; 701/503; 340/979; 340/980; 340/995.18; 340/995.26; 342/29; 342/451; 342/455; 342/457
(58) Field of Classification Search ............... 701/4, 9, 701/14, 120, 301, 409, 472, 503, 207; 340/29, 340/220, 451, 455, 457; 342/979, 980, 995.18, 342/995.26
See application file for complete search history.

(56) References Cited

U.S. PATENT DOCUMENTS

| | | | | |
|---|---|---|---|---|
| 5,177,608 A * | 1/1993 | Ohki et al. | ................. | 348/416.1 |
| 5,754,817 A * | 5/1998 | Wells et al. | ................... | 711/203 |
| 6,169,516 B1 * | 1/2001 | Watanabe et al. | ........ | 342/357.51 |
| 6,246,417 B1 * | 6/2001 | Kambe et al. | ................. | 345/619 |
| 7,103,796 B1 * | 9/2006 | Kekre et al. | ................... | 714/6.31 |
| 7,239,581 B2 * | 7/2007 | Delgado et al. | ................. | 368/10 |
| 7,287,133 B2 * | 10/2007 | Rowan et al. | ................. | 711/156 |
| 7,296,008 B2 * | 11/2007 | Passerini et al. | ..................... | 1/1 |
| 7,328,307 B2 * | 2/2008 | Hoogterp | ..................... | 711/114 |
| 7,409,587 B2 * | 8/2008 | Perry | ............................. | 714/15 |
| 7,577,808 B1 * | 8/2009 | Kushwah | ..................... | 711/162 |
| 7,631,120 B2 * | 12/2009 | Darcy | ............................. | 710/52 |
| 7,725,760 B2 * | 5/2010 | Rowan et al. | ............... | 714/5.11 |
| 7,827,362 B2 * | 11/2010 | Passerini | ..................... | 711/154 |
| 7,886,119 B1 * | 2/2011 | Cameron et al. | ............. | 711/162 |
| 7,904,428 B2 * | 3/2011 | Perry et al. | ..................... | 707/677 |

FOREIGN PATENT DOCUMENTS

JP 2008-014711 A 1/2008

OTHER PUBLICATIONS

Hartl, Precise Satellite Navigation by Means of the Global Positioning System Navstar GPS, 1995, Internet, p. 14-26.*

* cited by examiner

*Primary Examiner* — James Trammell
*Assistant Examiner* — McDieunel Marc
(74) *Attorney, Agent, or Firm* — Sughrue Mion, PLLC

(57) ABSTRACT

A method and apparatus for searching and generating trajectory content in a navigation device are provided. The method includes establishing a predetermined search region from a current position; extracting information about first parcels included in the established search region and information about second parcels including information about links of specific trajectory content; and determining whether the specific trajectory content is included in the established search region by comparing the information about the first parcels with the information about the second parcels.

21 Claims, 10 Drawing Sheets

○ : START POINT ● : ARRIVAL POINT

FIG. 3B

○ : START POINT ● : ARRIVAL POINT

METHOD FOR GENERATING AND SEARCHING THROUGH TRAJECTORY CONTENT PERFORMED IN NAVIGATION DEVICE

CROSS-REFERENCE TO RELATED PATENT APPLICATION

This application claims priority from Korean Patent Application No. 10-2008-0134956, filed on Dec. 26, 2008, in the Korean Intellectual Property Office, the disclosure of which is incorporated herein in its entirety by reference.

BACKGROUND OF THE INVENTION

1. Field of the Invention

The present invention relates to a navigation system, and more particularly to a method of searching through trajectory content in a navigation device that searches the trajectory content within a predetermined radius of a current position by using parcel information.

2. Description of the Related Art

Generally, a navigation device includes a global positioning system (GPS) receiving unit and a map memory unit. The navigation device receives the current travel position of a vehicle of the navigation device from a plurality of GPS satellites, outputs map information corresponding to the current travel position of the vehicle on a screen, and displays the current position of the vehicle on a map. Therefore, a navigation device can provide a driver with a driving status of their vehicles and guidance instructions of roads new to the drivers.

Generally, navigation devices search for positions using single points within a predetermined radius. However, the more positions there are within the predetermined radius, the longer it takes to search for the positions.

Therefore, a method of searching for a trajectory including a plurality of points within a predetermined radius on a map is required.

SUMMARY OF THE INVENTION

The present invention provides a method of generating and searching trajectory content in a navigation device that generates trajectory content by using parcel information and searches the trajectory content within a predetermined radius at a current position by using the parcel information.

According to an aspect of the present invention, there is provided a method of searching for trajectory content in a navigation device, the method including: establishing a predetermined search region from a current position; extracting information about first parcels included in the established search region and information about second parcels including information about links of specific trajectory content; and determining whether the specific trajectory content is included in the established search region by comparing the information about the first parcels with the information about the second parcels.

According to another aspect of the present invention, there is provided a method of generating trajectory content in a navigation device, the method including: extracting trajectory data based on information about a start point and an arrival point and information about parcels and links between the start point and the arrival point, and recording the extracted trajectory data on a specific file; registering position information about multimedia data stored in a local directory in the specific file; and mapping the trajectory data and the multimedia data together.

According to another aspect of the present invention, there is provided a navigation device, including: a user interface unit establishing a map region; a display unit displaying trajectory data and multimedia data; a map database unit storing map data and trajectory content data; and a controller comparing information about first parcels in a map region established by the user interface unit with information about second parcels including information about links of specific trajectory content, determining whether information about the specific trajectory content is included in the map region, and displaying the determined information about the trajectory content on the display unit.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF EXEMPLARY EMBODIMENTS OF THE INVENTION

Hereinafter, the present invention will be described more fully with reference to the accompanying drawings, in which exemplary embodiments of the invention are shown.

A navigation device according to an exemplary embodiment of the present invention provides a trajectory service by using trajectory content that includes trajectory data and multimedia data.

The trajectory content used by the navigation device according to the present exemplary embodiment includes trajectory data, such as a start point, an arrival point, and a road between the start point and the arrival point, and further includes multimedia data that is to be reproduced at a specific point. In this regard, if a plurality of pieces of trajectory content exists, a user needs to search through available trajectory content.

Figure 1:
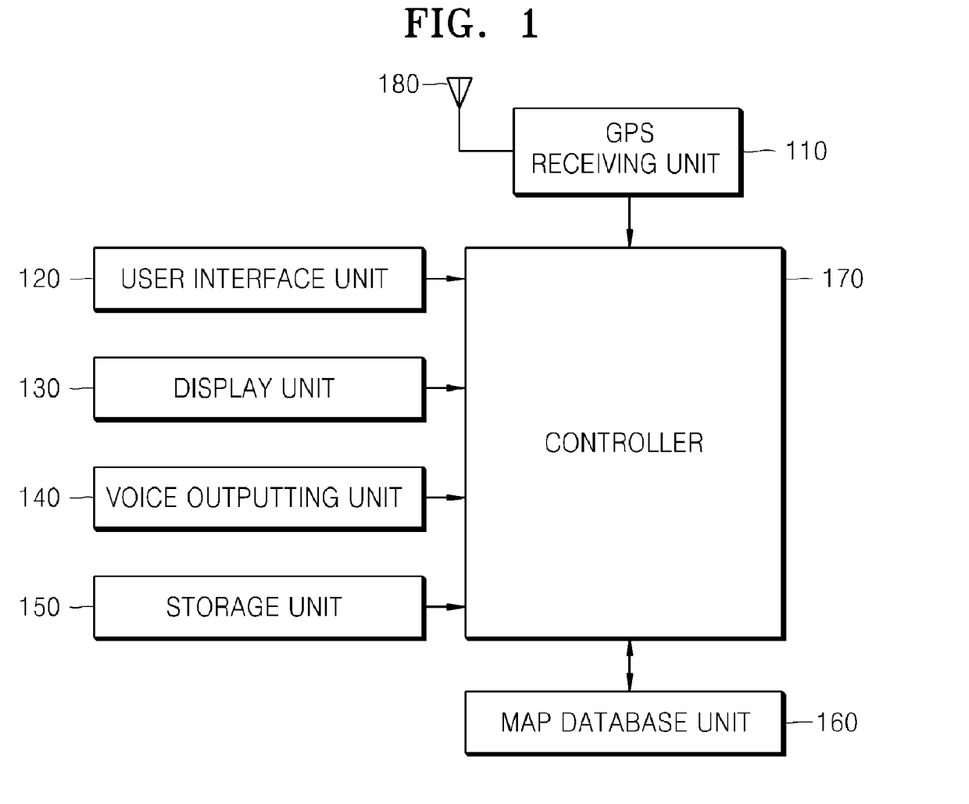
FIG. 1 is a block diagram of a navigation device according to an exemplary embodiment of the present invention.

FIG. 1 is a block diagram of a navigation device according to an exemplary embodiment of the present invention. Referring to FIG. 1, the navigation device includes a global positioning system (GPS) receiving unit 110, a user interface unit 120, a display unit 130, a voice outputting unit 140, a storage unit 150, a map database unit 160, a controller 170, and an antenna 180.

The GPS receiving unit 110 receives electric waves from a plurality of satellites belonging to the GPS through the antenna 180 included in the navigation device.

The user interface unit 120 includes a plurality of number keys and function keys used to perform various functions, and sends key data generated according to a user's key manipulation to the controller 170. The user interface unit 120 may be used to establish a desired search region to search for trajectory content, and may be used to select found trajectory content.

The display unit 130 displays trajectory data, multimedia data, map data, a current position of a moving object, a travel route thereof, and the like, on a screen, according to the controller 170.

The voice outputting unit 140 outputs audio data according to current travel route guidance in the form of voice.

The storage unit 150 temporarily stores a program to be used to operate the controller 170 and stores multimedia data processed during the operation of the controller 170.

The map database unit 160 stores map data and trajectory data.

The controller 170 detects the current position of the moving object based on the current position received by the GPS receiving unit 110, calculates the optimal route between the current position and a destination, matches the detected current position of the moving object with the map data stored in the map database unit 160, searches for a travel route of the moving object, and guides the moving object according to the found travel route. The controller 170 compares first parcel information in a map region established by the user interface unit 120 with second parcel information including link information of specific trajectory content, determines whether information about the specific trajectory content is included in a content search region, and displays the determined trajectory content information on the display unit 130.

Figure 2:
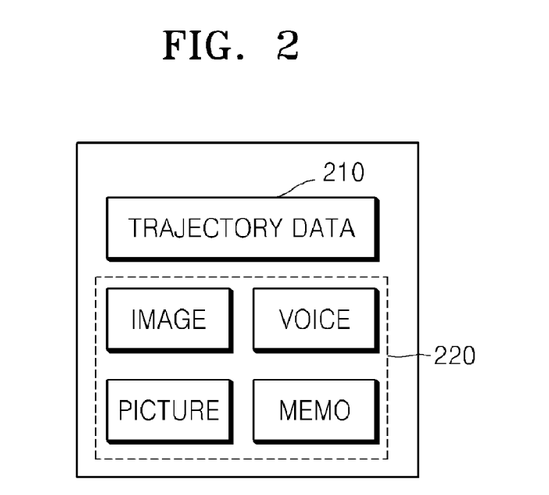
FIG. 2 is a block diagram of trajectory content information stored in a map database unit shown in FIG. 1.

FIG. 2 is a block diagram of trajectory content information stored in the map database unit 160 shown in FIG. 1. Referring to FIG. 2, the trajectory content information includes trajectory data 210 and multimedia data 220. The trajectory content information may be based on an extended markup language (XML) and may be extendible. The trajectory content information may be stored in a predetermined specific file. The trajectory data 210 and the multimedia data 220 are mapped to each other.

The trajectory data 210 includes start point information, arrival point information, and middle road information. The trajectory data 210 is generated by using the start point information, the arrival point information, and the middle road information based on simulations or information about a user's past travel. The navigation device calculates the route by using the start point information, the arrival point information, and the middle road information.

The start point information and the arrival point information have the same structure which includes single point unit information and position coordinates.

However, the middle road information is not single point unit information but is single road unit information, and includes link and parcel information.

The multimedia data 220 includes a file name to be reproduced and a position in a local memory corresponding to the file name to be reproduced. The multimedia data 220 includes images, voice, pictures, memos, and the like.

Figure 3A:
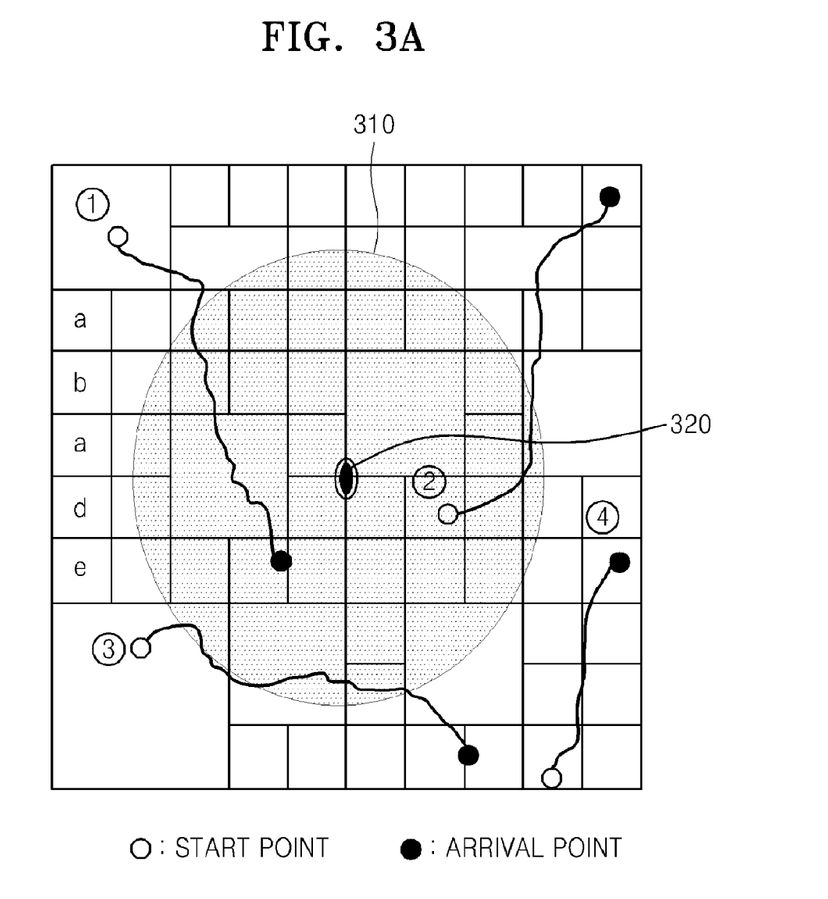
FIG. 3A is a view for explaining the relationship between a plurality of pieces of trajectory data and parcels, applied to an exemplary embodiment of the present invention.

FIG. 3A is a view for explaining the relationship between a plurality of pieces of trajectory data and parcels, applied to an exemplary embodiment of the present invention.

Generally, electronic maps are formed of lower level data, such as a parcel. A parcel may be defined as a logical construction unit of an electronic map stored in a map database.

Referring to FIG. 3A, each rectangular part may indicate a parcel. Each parcel has a parcel ID used to identify the parcels. The size of each parcel may be identical to or different from each other according to a predetermined tree structure.

The trajectory data ①, ②, ③, and ④ are each expressed as a line that includes a plurality of points, such as a start point ○, an arrival point ●, and a middle road connecting the start point and arrival point from a current position 320.

The trajectory data ①, ②, ③, and ④ which are expressed on an electronic map, need to have information about links and information about parcels corresponding to the links.

The trajectory data ① includes an arrival point and a part of a middle road within a radius 310.

The trajectory data ② includes a start point and a part of a middle road within the radius 310.

The trajectory data ③ includes a part of a middle road within the radius 310, but not a start point or an arrival point.

The trajectory data ④ does not include a start point, an arrival point, or a part of a middle road within the radius 310.

Figure 3B:
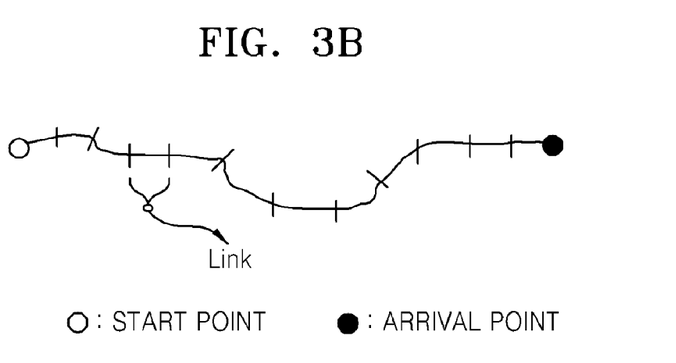
FIG. 3B is a view of the structure of a middle road included in the trajectory data shown in FIG. 3A.

FIG. 3B is a view of the structure of a middle road included in the trajectory data shown in FIG. 3A. The middle road is between a start point and an arrival point and includes continuous segments. Intrinsic information, such as a link ID and a parcel ID belonging to a corresponding link, is stored in each continuous segment.

Each link has an intrinsic ID used to identify the link in corresponding map information.

Therefore, trajectory data includes information about a start point and an arrival point, as single points, and information about a middle road relating to links.

Figure 4:
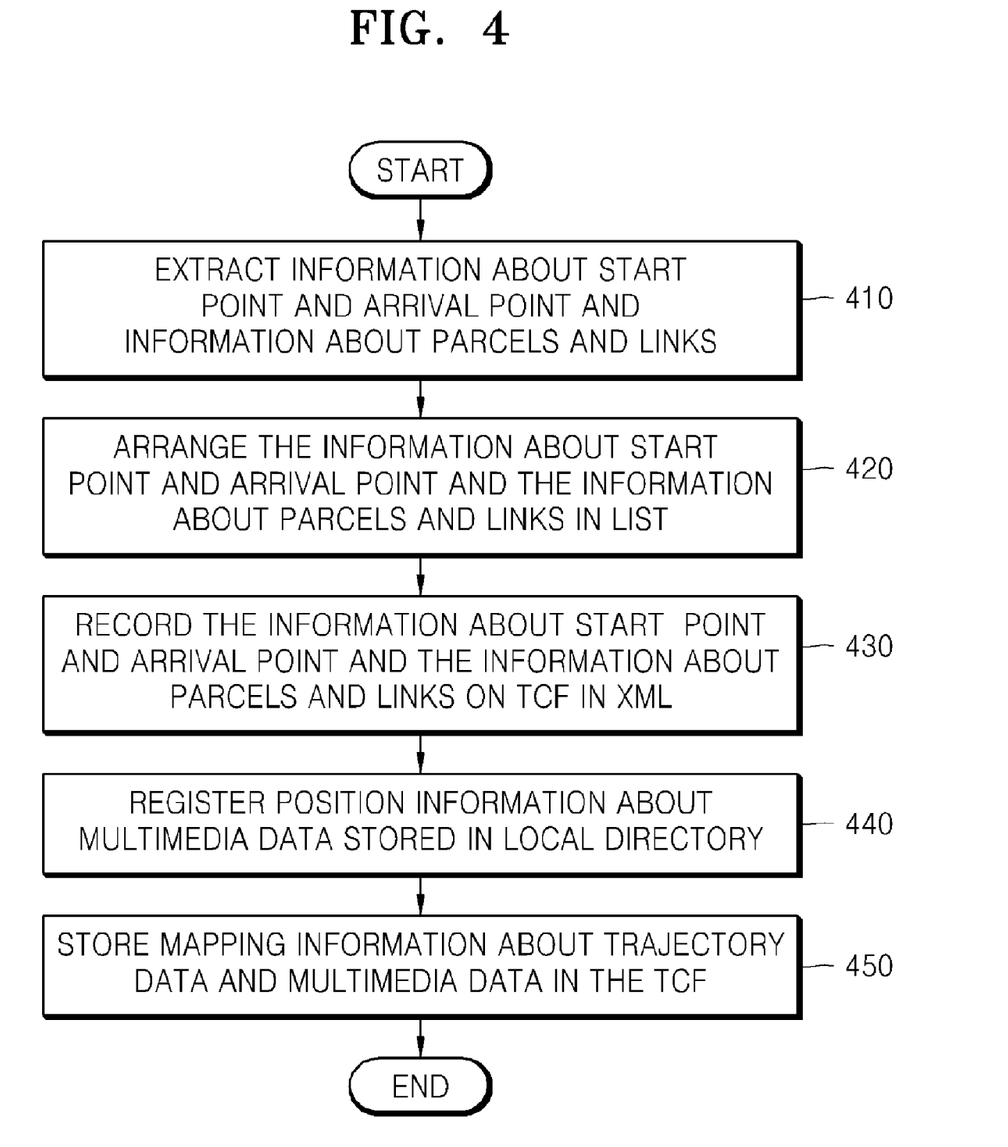
FIG. 4 is a flowchart illustrating a method of generating trajectory content in a navigation device, according to an exemplary embodiment of the present invention.

FIG. 4 is a flowchart illustrating a method of generating trajectory content in a navigation device, according to an exemplary embodiment of the present invention. Referring to FIG. 4, in operation 410, a plurality of pieces of trajectory data including information about a start point and an arrival point, ID information about links (or segments) used as a middle road between the start point and the arrival point, and ID information about parcels belonging to the links are extracted from predetermined map data. The parcel information and the link information are parcel IDs and link IDs, respectively.

In operation 420, the information about the start point and the arrival point, the link information, and the parcel information are arranged in a list.

In operation 430, the trajectory data including the information about the start point and the arrival point, the link information, and the parcel information is recorded on a trajectory content file (TCF) in XML.

In operation 440, position information about multimedia data stored in a local directory is registered in the trajectory content file.

In operation 450, multimedia data that is to be reproduced at a specific position (latitude and longitude) and trajectory data are mapped to each other, and mapping information is recorded on the trajectory content file.

Therefore, if a vehicle in which the navigation device is installed enters into a specific position corresponding to the latitude and longitude included in the mapping information, multimedia data that is mapped to the specific position may be reproduced.

Figure 5:
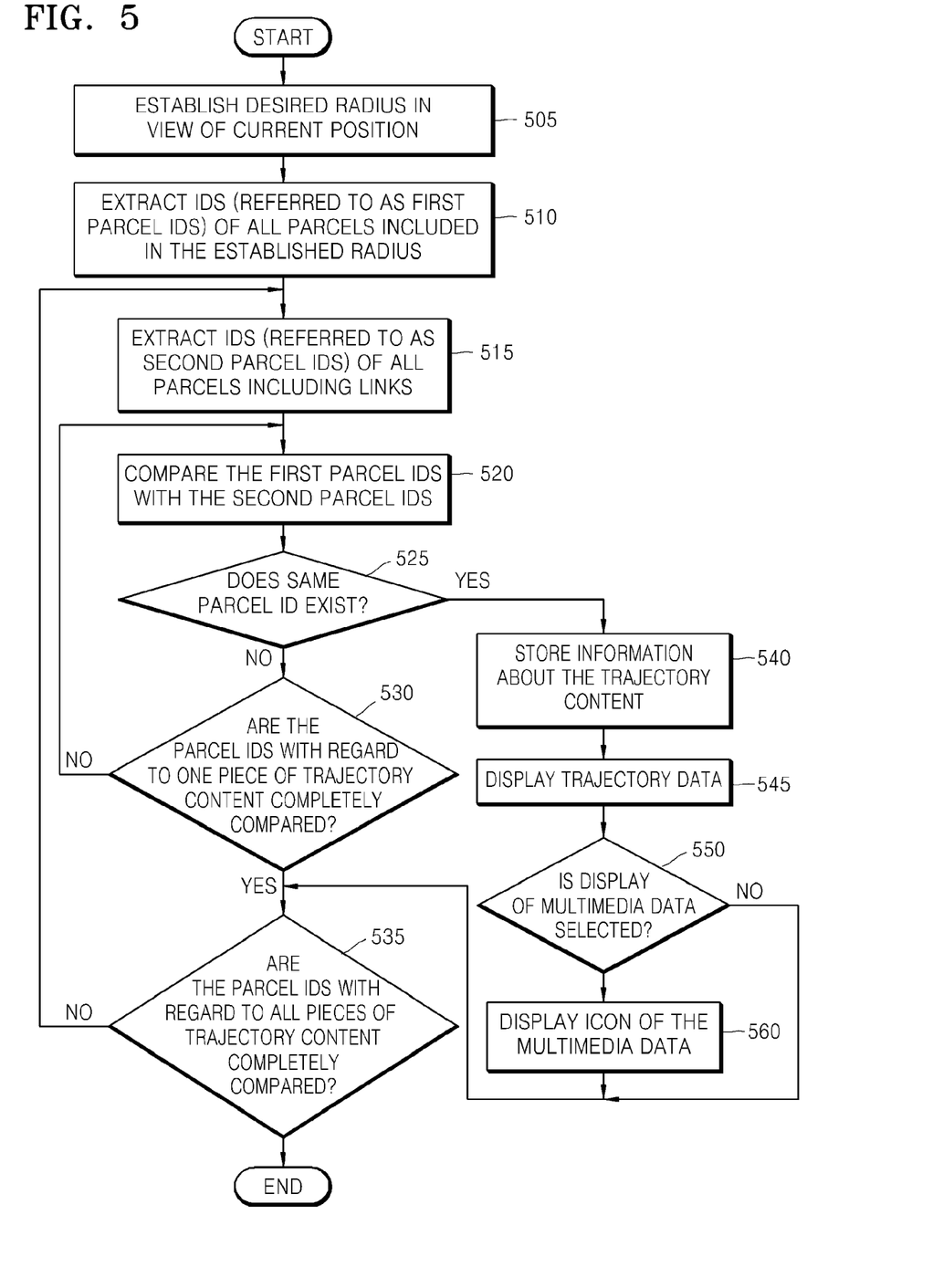
FIG. 5 is a flowchart illustrating a method of searching through trajectory content in a navigation device, according to an exemplary embodiment of the present invention.

FIG. 5 is a flowchart illustrating a method of searching for trajectory content in a navigation device, according to an exemplary embodiment of the present invention.

When a plurality of pieces of trajectory content is included in a map database, a user needs to search through available trajectory content from the plurality of pieces of trajectory content. The user searches for trajectory content within a predetermined radius from a user's position, or searches for content within a predetermined radius from a specific position.

In operation 505, a desired radius is established so as to search for trajectory content from a current position. In more detail, the user establishes a radius corresponding to a desired trajectory content search region through a user interface. It is assumed that the established radius is in the shape of a circle.

In operation 510, IDs (referred to as IDs of first parcels) of all parcels included in the established radius are extracted.

In operation 515, link IDs are extracted from segments of a middle road of the trajectory content, and IDs (referred to as IDs of second parcels) of all parcels including the extracted link IDs are also extracted.

In operation 520, the IDs of the first parcels and the IDs of the second parcels are compared so as to search for the trajectory content within the established radius. In operation 525, it is determined whether the IDs of the first parcels matches with the compared one of the IDs of the second parcels. If it is determined that the IDs of the first parcels and the IDs of the second parcels for a piece of trajectory content do not have the same parcel ID, in operation 530, it is determined whether parcel IDs have been completely compared to each other with regard to a piece of trajectory content. If it is determined that the parcel IDs has not been completely compared to each other with regard to the piece of trajectory content, operation 520 is performed.

If it is determined that parcel IDs has been completely compared to each other with regard to the piece of trajectory content, in operation 535, parcel IDs are completely compared to each other with regard to all pieces of trajectory content. If it is determined that the all pieces of trajectory content have not been completely compared to each other with regard to all pieces of trajectory content, operation 515 is performed.

Therefore, the parcel IDs are compared to each other until all pieces of trajectory content included in the map database are completely searched.

If it is determined that the parcel IDs are completely compared to each other with regard to all pieces of trajectory content, the trajectory content is completely searched.

Meanwhile, if the IDs of the first parcels and the IDs of the second parcels are compared to each other and the IDs of the first parcels and the IDs of the second parcels have the same parcel ID, in operation 540, information on the trajectory content belonging to the corresponding parcel ID is stored in the map database. In more detail, if the IDs of the first parcels and the IDs of the second parcels are compared to each other and since the IDs of the first parcels and the IDs of the second parcels have at least one parcel ID that is the same, the trajectory content is at least partly included in the radius.

For example, referring to FIG. 3A, since the trajectory data ①, ②, and ③ have at least one parcel ID that is the same between the IDs of the first parcels and the IDs of the second parcels, the trajectory data ①, ②, and ③ are included in the selected radius.

Meanwhile, since the trajectory data ④ does not have one parcel ID that is the same between the IDs of the first parcels and the IDs of the second parcels, the trajectory data ④ is not included in the selected radius.

In operation 545, trajectory data included in the information about the trajectory content, stored in the map database, is displayed on a screen.

In operation 550, it is determined whether multimedia data corresponding to specific trajectory content displayed on a user interface is selected.

If it is determined that the display of multimedia data is selected, in operation 560, an icon of the multimedia data is displayed. If it is determined that, in operation 550, display of multimedia data is not selected, operation 535 is performed.

The method of searching through the trajectory content of the present exemplary embodiment is not applied using a single point unit but is applied using a line unit including links or parcels, thereby reducing the amount of search calculations with regard to the trajectory content.

Figure 6:
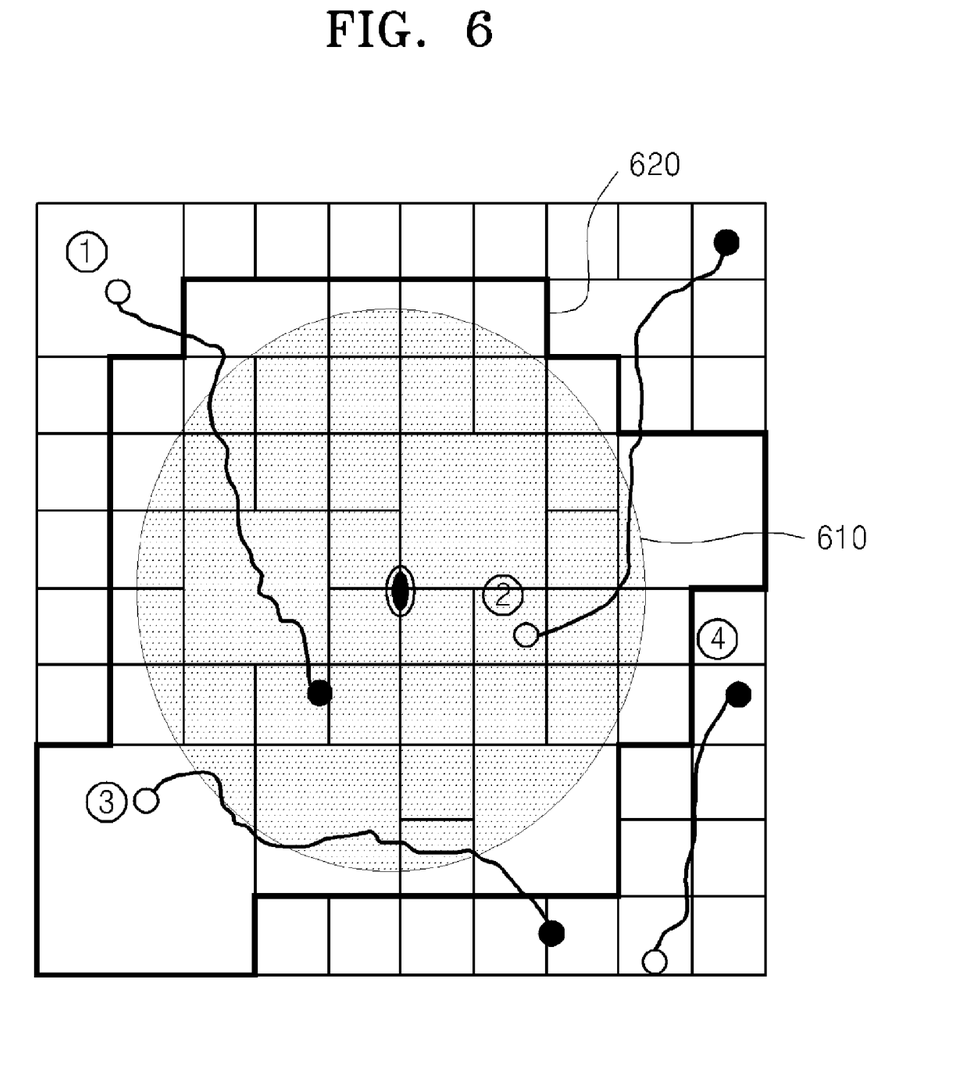
FIG. 6 is a view of a region including parcels compared according to an exemplary embodiment of the present invention.

FIG. 6 is a view of a region including parcels to be compared according to an embodiment of the present invention. Referring to FIG. 6, when parcels are large, a current search region 620 including parcel IDs to be compared may be greater than an intended circular search region 610.

Also, when parcels are small, the current search region 620 including parcel IDs to be compared may be quite similar to the intended circular search region 610.

If the parcel sizes of the intended circular search region 610 are different from those of the current search region 620, a search result may be possibly erroneous.

Therefore, by checking if the intended circular search region 610 includes start point coordinates, arrival point coordinates, and position coordinates at which multimedia data is to be reproduced, it is determined whether corresponding trajectory content is appropriate as a search result.

Figure 7:
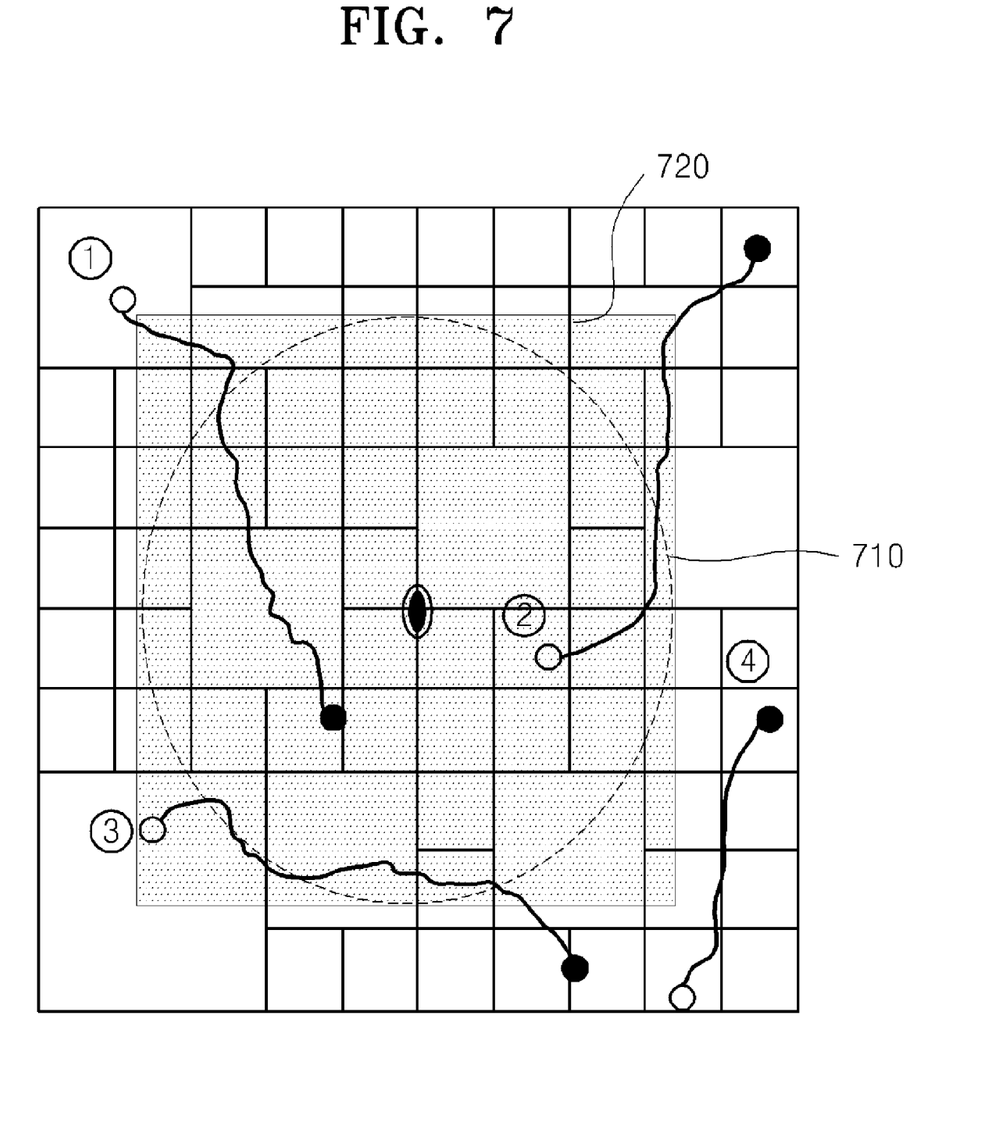
FIG. 7 is a view of a search region of trajectory content according to another exemplary embodiment of the present invention.

FIG. 7 is a view of a search region of trajectory content according to another exemplary embodiment of the present invention. Referring to FIG. 7, a circular search region 710 can be changed into a rectangular search region 720.

The method of searching through trajectory content of the rectangular search region 720 is the same as the method of searching through the trajectory content of the circular search region 710.

FIGS. 8A through 8D are views for explaining a trajectory service using found trajectory content according to an exemplary embodiment of the present invention.

Figure 8A:
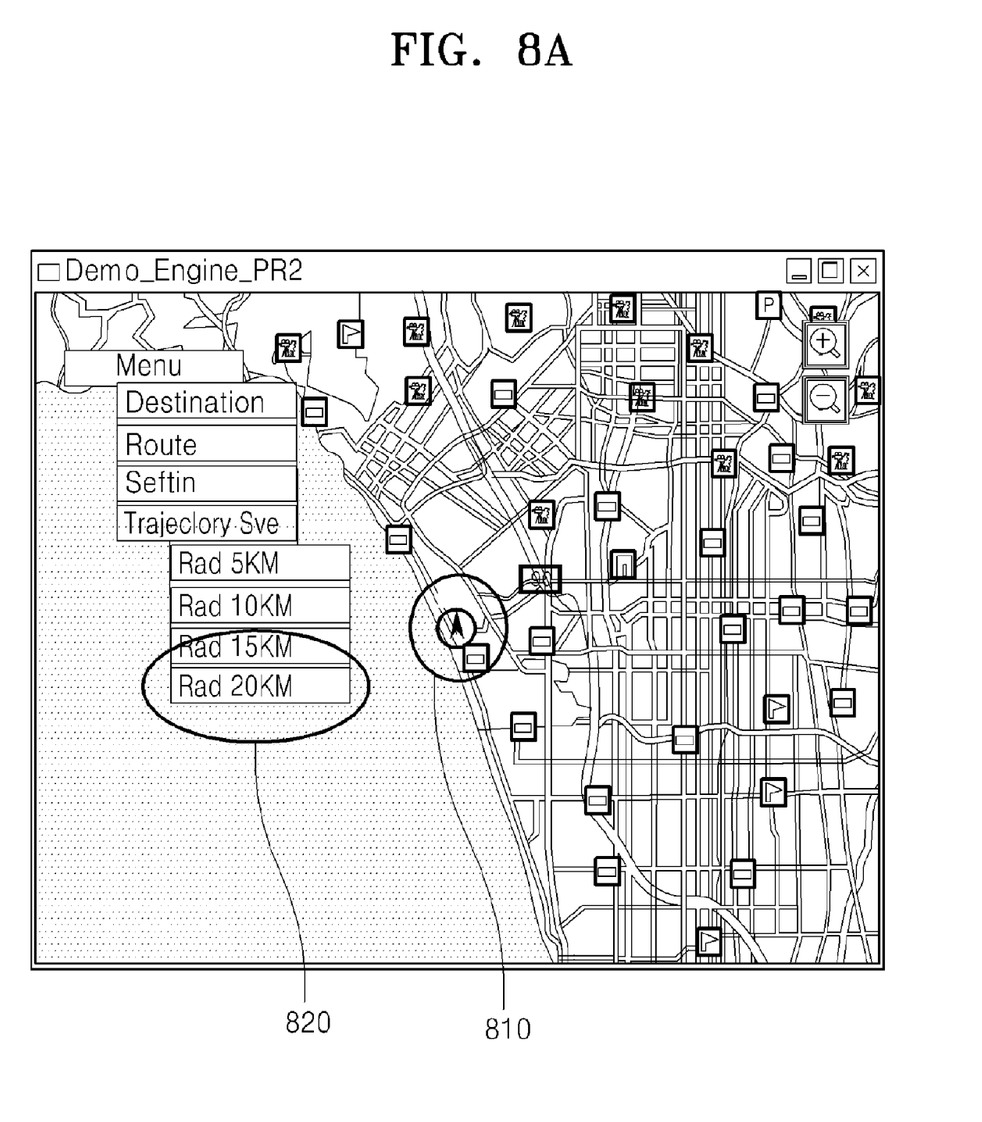
FIGS. 8A through 8D are views for explaining a trajectory service using found trajectory content according to an exemplary embodiment of the present invention.

Referring to FIG. 8A, trajectory content is searched for within a radius 820 of 20 km from a current position 810.

Figure 8B:
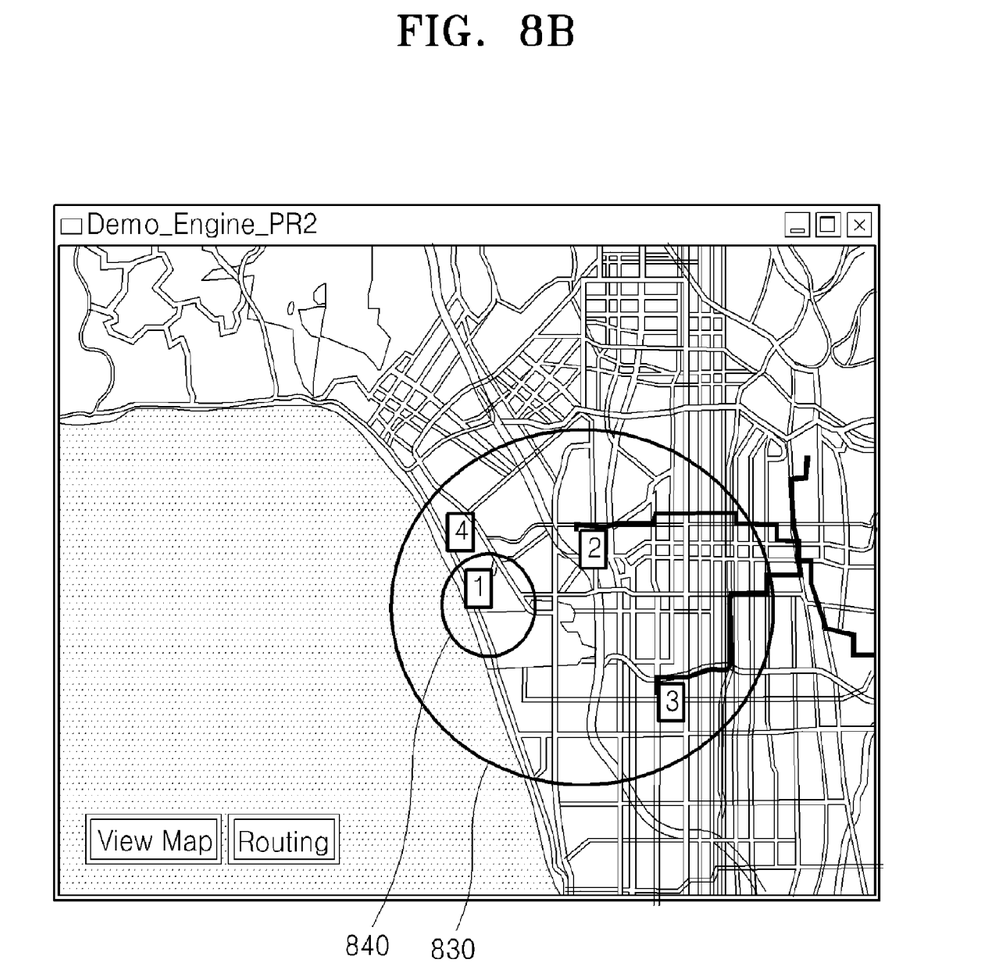

Referring to FIG. 8B, four pieces of trajectory content 830 are displayed, and a first piece of trajectory content 840 is selected from the four pieces of trajectory content 830.

Figure 8C:
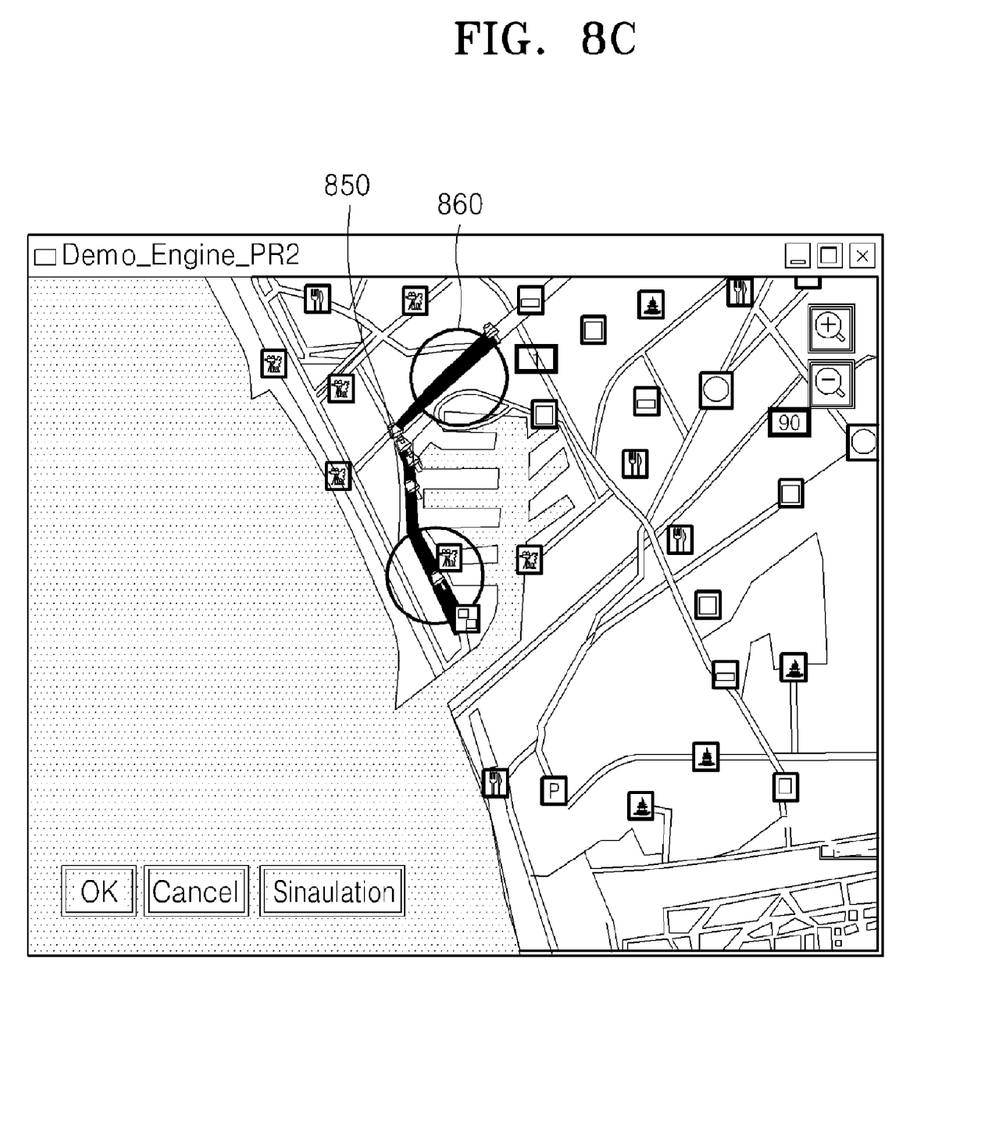

Referring to FIG. 8C, a position of multimedia data is displayed on a map as an icon 850 of a predetermined shape. A trajectory 860 of trajectory content is displayed on the map.

Figure 8D:
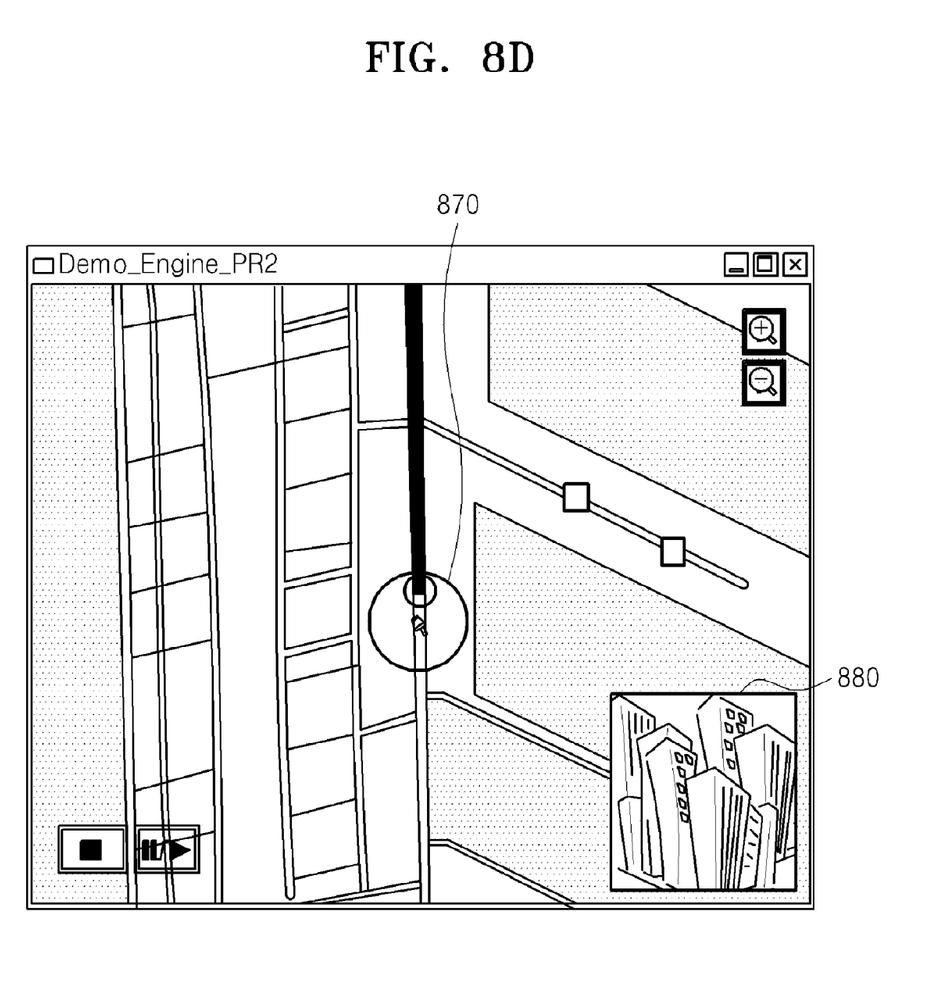

Referring to FIG. 8D, if a vehicle passes by a road position 870 at which multimedia data is designated, the navigation device reproduces multimedia data 880 that is mapped to the trajectory data. In this regard, reproducible multimedia data may include audio/video, pictures, text, and the like.

According to another exemplary embodiment, a trajectory content search algorithm can be applied to a media map. A media map includes map information such as geo-tagged pictures, motion pictures, sound, and the like.

Therefore, if a plurality of media maps are included in a map database, a user searches through trajectory content by using a parcel ID so as to search a desired media map.

The present invention can also be embodied as computer readable code on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices. The computer readable recording medium can also be distributed network coupled computer systems so that the computer readable code is stored and executed in a distributed fashion.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of searching for trajectory content in a navigation device, the method comprising:
    establishing a predetermined search region from a current position;
    extracting information about first parcels included in the established search region and information about second parcels including information about links of specific trajectory content; and
    determining, by a processor device, whether the specific trajectory content is included in the established search region by comparing the information about the first parcels with the information about the second parcels.

2. The method of claim 1, wherein the extracting the information about the first parcels and the information about the second parcels comprises:
    extracting IDs of the first parcels included in the established search region,
    extracting IDs of links used as a middle road between a start point and an arrival point from the specific trajectory content; and
    extracting IDs of the second parcels including the extracted IDs of the links.

3. The method of claim 1, wherein the determining whether the specific trajectory content is included in the established search region comprises:
    comparing IDs of the first parcels with IDs of the second parcels, and, if at least one parcel ID of the IDs of the first parcels is the same as at least one parcel ID of the IDs of the second parcels, determining that the specific trajectory content is included in the established search region.

4. The method of claim 3, wherein, if it is determined that, by comparing the IDs of the first parcels with the IDs of the second parcels, at least one ID of the IDs of the first parcels is the same as at least one parcel ID of the IDs of the second parcels, trajectory content including the same parcel ID is stored simultaneously with the trajectory content displayed on a screen.

5. The method of claim 4, wherein, if the displayed trajectory content is selected, an icon of multimedia data that is mapped to the trajectory content is displayed on the screen.

6. The method of claim 1, wherein the information about the first parcels and the information about the second parcels are compared to each other until all pieces of trajectory content in a map database are completely searched.

7. The method of claim 1, wherein the trajectory content includes multimedia data mapped to trajectory data.

8. The method of claim 1, wherein the trajectory data includes at least one of start point information, arrival point information, and middle road information.

9. The method of claim 1, wherein the size of each parcel is determined according to a predetermined tree structure.

10. The method of claim 9, wherein the size of each parcel is identical.

11. The method of claim 9, wherein each parcel has a different size.

12. A method of generating trajectory content in a navigation device, the method comprising:
    extracting trajectory data based on information about a start point and an arrival point and information about parcels and links between the start point and the arrival point, and recording the extracted trajectory data on a specific file;
    registering position information about multimedia data stored in a local directory in the specific file; and
    mapping, by a processor device, the trajectory data and the multimedia data together.

13. The method of claim 12, wherein the information about parcels includes IDs of logical construction units of an electronic map, and the information about links includes IDs of segments between the start point and the arrival point.

14. The method of claim 12, wherein the multimedia data includes a file name to be reproduced and a position in a local memory corresponding to the file name to be reproduced.

15. The method of claim 12, further comprising arranging the information about the start point and the arrival point, the information about parcels, and the information about links.

16. The method of claim 12, further comprising extracting trajectory data based on middle road information.

17. The method of claim 16, wherein the trajectory data is generated using start point information, arrival point information, and middle road information based on information about a user's past travel.

18. The method of claim 12, wherein the multimedia data is to be reproduced at a specific position, such that when the navigation device enters into the specific position the multimedia data is reproduced.

19. A navigation device, comprising:
    a user interface unit that establishes a map region;
    a display unit that displays trajectory data and multimedia data;
    a map database unit that stores map data and trajectory content data; and
    a controller that compares information about first parcels in a map region established by the user interface unit with information about second parcels including information about links of specific trajectory content, determines whether information about the specific trajectory content is included in the map region, and displays the determined information about the trajectory content on the display unit.

20. A non-transitory computer readable recording medium storing a program that, when executed by a computer, performs a method comprising:
    establishing a predetermined search region from a current position;
    extracting information about first parcels included in the established search region and information about second parcels including information about links of specific trajectory content; and
    determining whether the specific trajectory content is included in the established search region by comparing the information about the first parcels with the information about the second parcels.

21. A non-transitory computer readable recording medium storing a program that, when executed by a computer, performs a method comprising:
    extracting trajectory data based on information about a start point and an arrival point and information about parcels and links between the start point and the arrival point, and recording the extracted trajectory data on a specific file;

registering position information about multimedia data stored in a local directory in the specific file; and mapping the trajectory data and the multimedia data together.

* * * * *